United States Patent
Hamain et al.

(10) Patent No.: US 10,176,707 B2
(45) Date of Patent: Jan. 8, 2019

(54) REMOTE CONTROL

(71) Applicant: Siatech, Rouen (FR)

(72) Inventors: Frédéric Hamain, Ry (FR); Nicolas Iriart, Le Petit Quevilly (FR); Nicolas Klis, Narbonne (FR)

(73) Assignee: SIATECH, Rouen (FR)

( * ) Notice: Subject to any disclaimer, the term of this patent is extended or adjusted under 35 U.S.C. 154(b) by 0 days.

(21) Appl. No.: 15/739,010

(22) PCT Filed: Jun. 8, 2016

(86) PCT No.: PCT/FR2016/051374
§ 371 (c)(1),
(2) Date: Dec. 21, 2017

(87) PCT Pub. No.: WO2016/207505
PCT Pub. Date: Dec. 29, 2016

(65) Prior Publication Data
US 2018/0190106 A1 Jul. 5, 2018

(30) Foreign Application Priority Data

Jun. 23, 2015 (FR) .................................. 15 557737

(51) Int. Cl.
*G06F 3/01* (2006.01)
*G08C 17/02* (2006.01)

(52) U.S. Cl.
CPC ............. *G08C 17/02* (2013.01); *G06F 3/014* (2013.01); *G06F 3/017* (2013.01); *G08C 2201/32* (2013.01); *G08C 2201/70* (2013.01)

(58) Field of Classification Search
CPC ........................... G08C 17/02; G08C 2201/32; G08C 2201/70; G06F 3/014; G06F 3/165;
(Continued)

(56) References Cited

U.S. PATENT DOCUMENTS 9,122,276 B2 * 9/2015 Kraimer ............... G05D 1/0016
9,235,984 B2 * 1/2016 Raynor ................. G08C 17/02
(Continued)

FOREIGN PATENT DOCUMENTS

WO    2012054443 A1    4/2012
WO    2014164168 A1    10/2014

OTHER PUBLICATIONS

International Search Report for International Application No. PCT/FR2016/051374 dated Sep. 6, 2016, 3 pages.
(Continued)

*Primary Examiner* — Ali Neyzari
(74) *Attorney, Agent, or Firm* — TraskBritt (57) ABSTRACT

The present disclosure relates to a remote control including an electronic circuit comprising means for detecting the position, orientation and movement of the hand and/or forearm such as an accelerometer, means for transmitting at radiofrequency a control signal calculated depending on the measured position, orientation and movement, and a means for fastening to the forearm of an operator, wherein the remote control further comprises a contactor able to be actuated by the interaction of two fingers, the contactor controlling the activation of the electronic circuit and the maintenance of the control signal until the action on the contactor is stopped, and a bearing surface associated with a contactor controlling an emergency stoppage of the controlled equipment.

15 Claims, 3 Drawing Sheets

(58) Field of Classification Search
CPC ..... G06F 3/013; B60R 21/0132; B60R 25/00; B66F 9/0758; G05D 1/0022; G05D 1/0016
USPC ........................ 340/5.62, 12.5; 701/2; 700/94
See application file for complete search history.

(56) References Cited

U.S. PATENT DOCUMENTS

| | | | |
|---|---|---|---|
| 9,483,115 B2* | 11/2016 | Irmler | ..................... G06F 3/014 |
| 2014/0358263 A1 | 12/2014 | Irmler et al. | |

OTHER PUBLICATIONS

International Written Opinion for International Application No. PCT/FR2016/051374 dated Sep. 6, 2016, 5 pages.

* cited by examiner

REMOTE CONTROL

CROSS-REFERENCE TO RELATED APPLICATIONS

This application is a national phase entry under 35 U.S.C. § 371 of International Patent Application PCT/FR2016/051374, filed Jun. 8, 2016, designating the United States of America and published as International Patent Publication WO 2016/207505 A1 on Dec. 29, 2016, which claims the benefit under Article 8 of the Patent Cooperation Treaty to French Patent Application Serial No. 1555737, filed Jun. 23, 2015, the disclosures of which are incorporated herein in their entireties by this reference.

TECHNICAL FIELD

The present disclosure relates to the field of remote controls, specifically of industrial equipment and, more particularly, to equipment such as lifting or handling equipment, especially gantry cranes, bridge cranes, cranes, lift trucks, pallet trucks, stackers, order pickers, truck-mounted winches, boat lift cranes, automatic logistics warehouses, as well as mobile machines, such as boat trailers/bridges, tunneling machines, on-board pumps/concrete mixers, drilling machines, mills, demolition arms, building machines, cleaning vehicles, railway vehicles, wood handling equipment or agricultural machines.

Remote control is a known control mode in the industry. The development of affordable motion capture technologies recently opened the way to remote control solutions for directly driving the apparatus with one's body. The aim is to develop intuitive control between the man and the machine.

BACKGROUND

Control solutions positioned at the operator's hand enabling him/her to operate the device to be controlled are known in the art.

For instance, the international application WO 2014164168, which discloses a control system for a materials handling vehicle, discloses a hand-held wireless remote control device that is carried by an operator who interacts with the materials handling vehicle and includes a receiving area, a removably attachable communication device and a motion control. The motion control is communicatively connected with the wireless transmitter, with the actuation of the motion control resulting with the wireless transmitter transmitting a motion request as a first-type signal requesting the materials handling vehicle to move on a floor surface in a first direction.

U.S. Patent Application 2014/0358263 discloses a control system for selectively operating a sound system, for instance, for playing audio files in an order defined by a dialogue tree. The control system includes a trigger mechanism provided in the costume operable by an operator wearing the costume to generate and transmit at least one trigger signal to navigate through a dialogue tree. A controller receives the trigger signal and transmits a control signal, causing the sound system to play back pre-recorded dialogue.

International application WO 2012/054443 describes an electronic control glove enabling the improved control over wireless electronic devices from the user's fingertips. The glove is made of conductive materials along the fingers and the thumb, with a contact of the conductive material of a finger with the conductive material of the thumb creating a closed circuit that is transmitted to a control device on the glove that can then emit wireless messages to remote electronic devices such as cell phones, audio players, garage door openers, military hardware and software in work environments, etc.

These solutions are not completely satisfactory for use in industrial environments. In such environments, security is a major constraint. It is essential to avoid inappropriate control resulting, for example, from an involuntary movement of the hand equipped with a remote control glove, or improper selection of a button for equipment provided with, as described in the international application WO 2014/164168, a plurality of buttons, each one corresponding to a specific action.

The use of such a glove requires learning to enable an almost reflex action, without risk of confusion between the different keys available. The involuntary or inappropriate pressing of a key irreversibly triggers an action by the controlled equipment that may be, at best, inappropriate, but sometimes hazardous.

In addition, remote control equipment is subjected to multiple stresses (shocks, sweat, dust, humidity, etc.).

The gloves disclosed in the prior art do not make it possible to fully solve these problems because they require the availability of a large number of sizes so that each operator can have a remote glove adapted to his/her morphology. In addition, the gloves are subjected to high stresses that are less compatible with the integration of an electronic component.

BRIEF SUMMARY

To remedy these drawbacks, the invention, in its broadest sense, relates to a remote control including an electronic circuit comprising means for detecting the position, orientation and movement of the hand and/or forearm such as an accelerometer, means for transmitting at radio frequency a control signal calculated depending on the measured position, orientation and movement, and a means for fastening to the forearm of an operator, characterized in that it furthermore includes a contactor able to be actuated by the interaction of two fingers, with the contactor controlling the activation of the electronic circuit and the maintenance of the control signal until the action of the contactor is stopped, and a bearing surface associated with a contactor controlling an emergency stop of the controlled equipment.

This solution solves the problem of operational safety, in particular, relating to the interferences caused by unintentional movements by the operator. It also enables a very intuitive utilization, requiring only a very simple learning, with a large number of orders that can be transmitted, with the operator having to act only to enable or disable the transmission of instructions otherwise continuously acquired by the movements of his/her hand, his/her arm or his/her forearm.

The electronic circuit advantageously comprises a threshold detector for generating a control signal when the signal measured by the accelerometer exceeds a threshold value, as well as the maintenance of such control signal until the action on the contactor is stopped.

The equipment according to the disclosure may include additional modules comprising a strap, a box containing the electronic circuit and the accelerometer, and a contactor adapted to be positioned around a finger.

The accelerometer preferably detects the accelerations along three perpendicular axes.

Alternately, a gyroscope detects the angular position along three axes of rotation.

According to another alternative solution, the equipment further comprises a magnetometer for detecting the magnetic orientation.

According to another alternative embodiment, the equipment further comprises an inertial unit comprising an accelerometer with three perpendicular axes, a gyroscope with three rotational axes and a three-axis magnetometer.

The inertial unit advantageously detects the angle of slope, the orientation and the accelerations along three perpendicular axes.

The equipment further comprises an emergency stop button.

According to an advantageous embodiment, the equipment further includes a single connector of the box intended for connecting the finger stall and the charger.

According to an alternative embodiment, the equipment further comprises a second contactor positioned in the electrical circuit and intended to be controlled by the second hand.

According to another alternative embodiment, the equipment further comprises a plurality of contactors for selecting the controlled device or one of the functionalities of the controlled equipment.

It advantageously comprises a digital, stepping or two-way contactor.

According to a specific embodiment, the equipment further comprises means for controlling a strumming mode according to the storage of the last direction detected by the accelerometer and on the repeated actions on the contactor.

According to another specific embodiment, it further comprises means for controlling the two-rate movement.

The disclosure also relates to a method for controlling equipment according to a protocol disclosed hereunder.

BRIEF DESCRIPTION OF THE DRAWINGS

The present disclosure will be best understood when reading the following description thereof, which relates to a non-restrictive exemplary embodiment, while referring to the appended drawings, wherein.

DETAILED DESCRIPTION

In today's world, remote controls are present at every level. The objective is to replace traditional remote controls by driving the device directly with one's body. As a matter of fact, the issue is developing intuitive control between the man and the machine. This control will be positioned at the hand and the operator will then be able to act on the device to be controlled. As the applications are many, we had to focus on one application field. We chose the industrial field, and more specifically the field of handling. We want to control "drivable" devices in the field of handling, specifically bridge cranes.

Nearly all bridge cranes are controlled via a remote control, a cockpit or a computer interface to make the connection between the man and the machine. With regard to remote controls, some are wired and some are wireless. These wireless electronic communication tools have the disadvantage of being bulky, can be easily lost and are required to maintain a line of sight when pressing a button.

The first need satisfied by the present disclosure is eliminating the major constraints of remote controls but also establishing additional control in the interaction with the different devices positioned around the user who will no longer have the concern of transporting, breaking, or searching for the remote control because it will always be "at hand" and who will be able to focus on the evolution of the controlled equipment, thanks to the intuitive operation of the remote control.

The user controls the movements simply by moving his/her hand (for example, a movement of the hand to the right will cause a movement of the bridge crane to the right) and the validation of the transmission by acting on a contactor.

The equipment includes two complementary modules. One of the modules is placed at the wrist, and contains the intelligence of the device, i.e., the micro-controller, the sensors (e.g., an inertial measurement unit (IMU)), the transmission electronics and a battery. The second module is in the form of a wire ring placed at the middle phalanx of the middle finger or the forefinger. This second module is the flexible part of the device and makes it possible to enable the motion capture by simply pressing the contactor.

First Exemplary Embodiment

The non-limiting embodiment of the disclosure relates to a remote control of a bridge crane through the movements of the hand.

Figure 1:
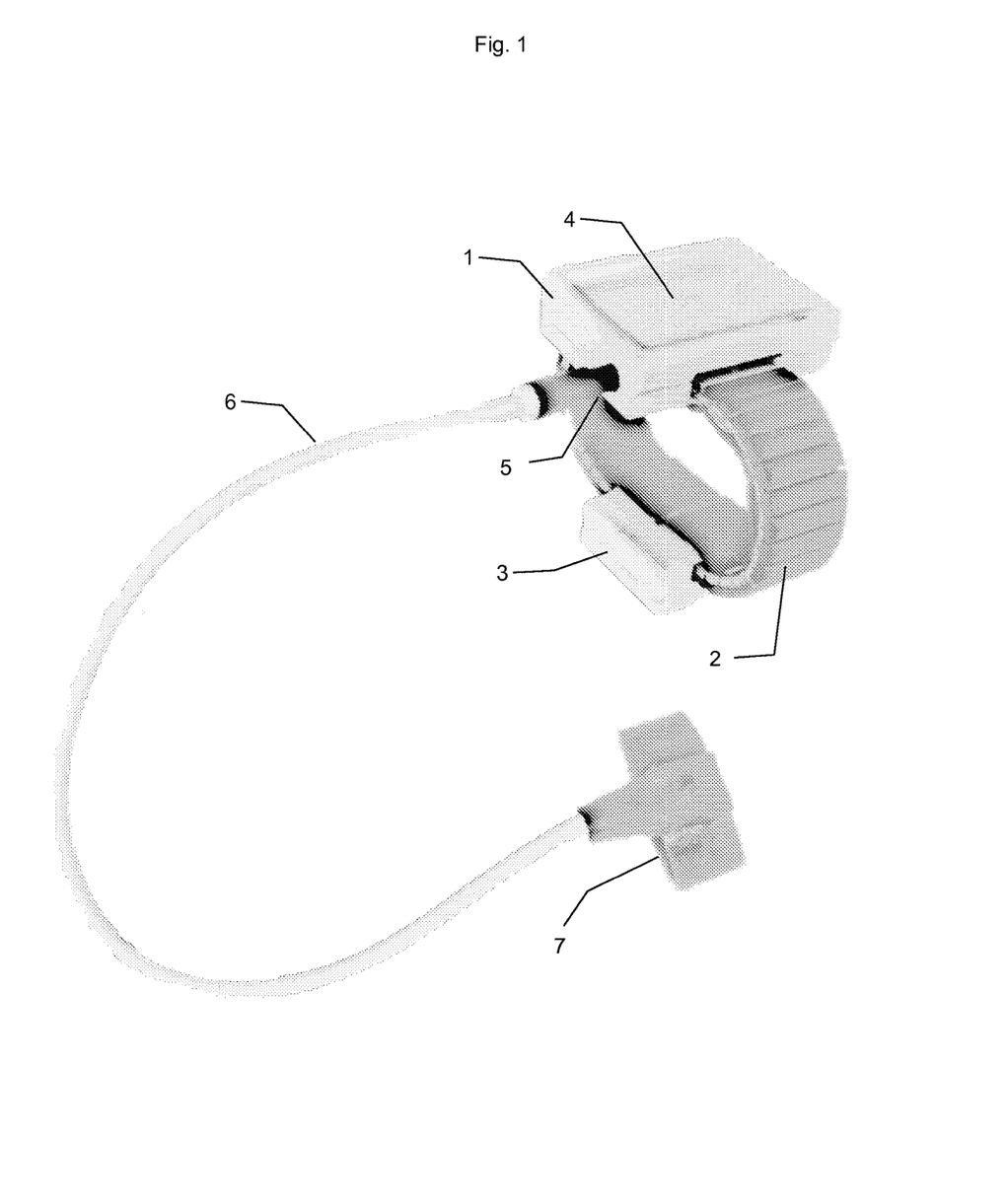
FIG. 1 is a schematic view of a piece of equipment according to the disclosure.
Figure 2:
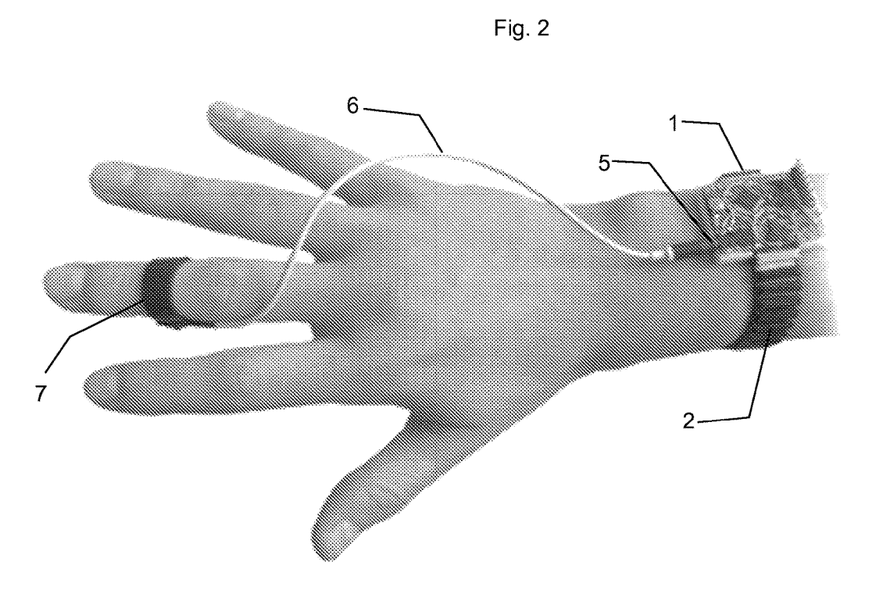
FIG. 2 is a view of a piece of equipment according to the disclosure worn by an operator.

The equipment comprises a box 1 that, in the example described, can be fitted to a strap 2 through a reversible mechanical connection.

Such box 1 accommodates the electronic circuit comprising a micro-controller, an accelerometer, a battery and a battery charging pilot circuit. The upper part of the box 1 has a surface 4 associated with a contactor enabling the user to control a function of emergency stop of the controlled equipment.

The box 1 also has, on one of its side faces, a socket 5 having a double function:
  when not in use, it enables the connection of a connector for charging the battery built in the box 1.
  in use, it enables the connection of a cable 6 connecting the circuits of the box 1 and a digital contactor 7.

In the non-restrictive example described, this strap is provided with a second box 3 having a remote transmission electronic circuit using a protocol such as BLUETOOTH®, or XBEE® and a master switch. Instead of such master switch for setting in a stand-by mode, the electronic circuit may comprise means for the automatic management of the setting in standby mode or of activation through a delay modifying the motion detection period making the switch optional. In use, the frequency of acquisition of the signals delivered by the accelerometer is high, for instance, 50 times per second. In the absence of detected signals for a predetermined period, for example, several minutes, such acquisition frequency is reduced to an acquisition for a period of a few seconds, every ten minutes, for example. Detecting a motion during such acquisition periods switches the circuit from the standby mode to the active mode.

This strap equipped with electronic circuits is connected to a micro-contactor having the shape of a ring or a finger stall placed on the middle phalanx of the middle finger or the index and makes it possible to authorize the motion capture depending on its condition.

Such micro-contactor is controlled by the pressure of another finger, normally the thumb, against the ring positioned around another finger.

This equipment operates as follows:

When the strap is positioned, the movements of the operator's forearm trigger the switching to the active mode.

As long as the contactor equipping the ring 7 is not activated, the signals generated by the accelerometer are not taken into account and the remote transmission circuit does not transmit control signals to the receiver fitted to the equipment, for instance, the controlled gantry crane.

The electronic circuit can nevertheless produce control frames transmitted to the controlled equipment, containing information on the status of the electronic circuit, the identifier of the circuit stored in a memory, the state of charge of the battery or the power of the transmitted signal, for instance.

When the operator actuates the micro-contactor provided on the finger stall 7, the electronic circuit analyzes the signals transmitted by the accelerometer for determining the direction of movement of the equipment. In the case of a three-axis accelerometer, processing comprises determining the most probable direction (vertical, lateral, longitudinal) and the orientation thereof (up/down, left/right, front/back). The electronic circuit transmits such information to the receiver provided on the controlled equipment through the radio-frequency circuit during the time that the operator keeps the micro-contactor in the active mode. As soon as the action on the contactor is stopped, the device sends a signal to stop the ongoing movement.

During this sequence, the movement direction and orientation remain those detected at the time the contactor has been activated. If the operator then moves his/her arm in different directions, this does not affect the nature of the movement of the controlled equipment after a predetermined time.

In an alternative version of this sequence, the operator will perform a combination of movements during this predetermined time, in order to enable a combination of motions (for instance, right and down).

According to an alternative embodiment, a repeated action on the contactor for a limited period of time, for example, two pressures spaced by less than one second extended by a pressure holding, causes the switching from a first movement mode to a second movement mode (for instance, fast/slow) or incremental jerky movements, but always in the initial direction and orientation, detected upon the first action on the contactor.

In another alternative embodiment, the equipment also includes a gyroscope providing a signal varying according to the rotation along one or more axes to control rotational movements or to control the stopping of a movement.

In another alternative embodiment, the equipment also includes a sensor of the inertial measurement unit (IMU) type, making it possible to determine the acceleration and a movement of the operator's arm, not in the operator's reference system, but in an absolute reference system. Such alternative embodiment makes it possible to intuitively control the movement regardless of the relative position of the operator relative to the controlled equipment.

Figure 3:
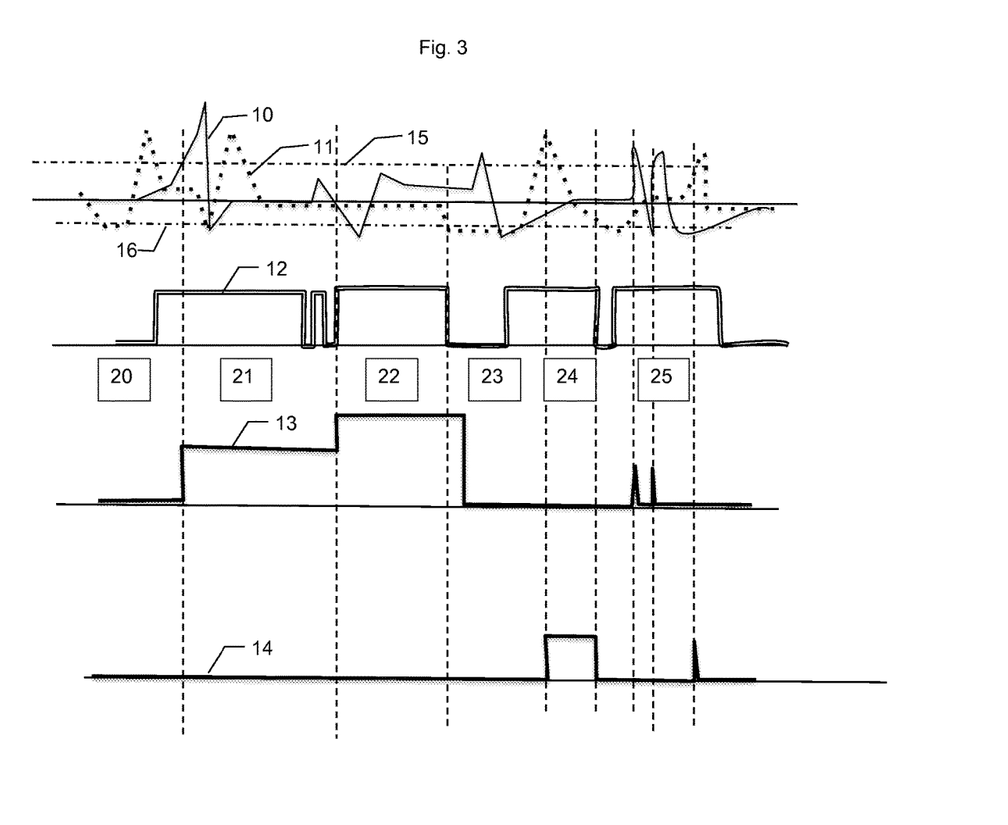
FIG. 3 shows the time graph of signals generated by the equipment.

FIG. 3 shows a simplified view of the various signals processed by the equipment.

The upper graph shows exemplary acceleration signals detected by two ways of an accelerometer, for instance:
one axis detecting the movements of the forearm in a vertical "up/down" direction and delivering a signal $A_v$ 10 shown by the continuous line, and
one axis detecting the movements of the forearm in a horizontal "left/right" direction and delivering a signal $A_{gd}$ 11 shown by the dotted line.

The following graph corresponds to the state of the micro-contactor, with a level 0 corresponding to the absence of action on the micro-contactor, and a level 1 corresponding to the state where the operator presses the micro-contactor. The curve 12 represents an example of a succession of actions on the micro-contactor.

The last two graphs represent the state of the control of the movement of the remotely controlled equipment, with a level 0 corresponding to stop and "+1" or "−1" levels corresponding to the direction of movement, and optionally for each movement direction, a "slow motion" level and a "fast motion" level for two directions of movement:
lifting-removal corresponding to the curve 13,
side motion of a truck corresponding to the curve 14.

For the signals delivered by the three-axis accelerometer, the threshold value corresponding to the curves 15, 16 being exceeded is taken into account. These curves are preferably constant. They may also be variable, for example, based on historical data in order to enable an adjustment of the type of the operator's movement, during a learning step, or based on data from the controlled equipment, to adapt the sensitivity of detection of the movements of the forearm to the nature of the operations being controlled.

As long as the state of the micro-contactor is "0," as in the sequence shown by reference 20, the signals 10, 11 of the accelerometer are not taken into account, even when they exceed the threshold value 15.

When the state of the micro-contactor is "1," nothing happens until one of the signals 10, 11 from the accelerometers exceeds the threshold value 15.

When the state of the micro-contactor is "1," and a threshold exceeding is detected on one of the signals 10, at the same time, the device sends a movement signal 13 corresponding to the accelerometer for which the exceeding of the threshold value was detected. In this example, the sequence bearing reference 21 illustrates a situation where the signal $A_v$ 10 temporarily exceeded the threshold value, which activates the "lifting-removal" movement of the equipment. This movement continues afterward, even though the signal $A_v$ falls down to a value below the threshold value, so long as the state of the micro-controller does not change to a "0" state for a time longer than a predetermined time $T_{fin}$, for instance, one second.

Micro-interruptions of less than one second will not interrupt the transmission of a control signal, but can control the switching to another mode of operation, for example:
two separate micro-interruptions of a duration below $T_{fin}$, cause the switching of the state of movement, from the slow mode to the fast mode, in the same direction and in the same orientation as the one that was active before such micro-interruptions,
a separate micro-interruption of less than $T_{fin}$, causes the switching to the jerky movement mode.

The sequence bearing reference 22 illustrates the situation where the operator briefly interrupted the action on the micro-contactor, with a repeat, while the control signal controlled the movement in the "lift" direction. This movement then continues, but at an accelerated rate.

The sequence 23 illustrates a sequence where the operator stopped the action on the micro-contactor for a duration greater than $T_{fin}$. The motion of the controlled equipment stops at the end of the time $T_{fin}$, after stopping the action on the micro-contactor.

Then, when the operator presses again on the micro-contactor, the equipment resumes detecting that the threshold value 15 has been exceeded by one of the signals 10, 11 of the accelerometer, to control a new motion of the controlled equipment.

In the example described and referenced by the sequence 24, the first detected signal exceeding the threshold value is the signal 11, which will then activate the lateral movement of a truck according to a control represented by the curve 14.

When the operator briefly releases, for a time below $T_{fin}$, the action on the micro-contactor, as shown in the sequence 25, he/she triggers the "jerky" mode. In this mode, each time one of the signals 10, 11 delivered by any one of the axes of the accelerometer exceeds the threshold value 15, 16, the equipment controls the movement in the corresponding direction and orientation for a brief pulse, and the time during which the action on the micro-contactor is maintained.

This mode enables the operator to finely adjust the position of the controlled equipment by small jolts of the forearm along any of the axes. Optionally, this mode further controls a variation in the threshold values 15, 16 to improve the sensitivity of the equipment in this fine adjustment step.

According to an alternative solution, when the operator briefly releases the action on the micro-contactor, by rotating the hand for a time below $T_{fin}$, the "strumming/jerks" mode is engaged. In this mode, each micro-interruption lasting less than $T_{fin}$ will make it possible to control the movement in the last direction and the corresponding last orientation, as long as the action on the micro-contactor is maintained.

This mode enables the operator to finely adjust the position of the controlled equipment by micro-interruptions.

Electronic Circuit

The electronic equipment comprises:
Two micro-controllers: a control μP and a security μP
One IMU
One emergency stop
One transmission module (Sub Ghz)
One 3.7V 200 mAh battery
One charging connection (jack)
One connection for the scalable portion (jack)
One memory device (e.g., a erroelectric random access memory (FRAM) device)

The scalable/disposable portion consists of a ring integrating a double control contactor. Such contactor ring is connected to the main module through a wire connection and connecting means to be validated or defined. The strap will also be a scalable/disposable portion.

Such components may make it possible to reach a minimum self-containment of one week. Such components are of the low-nature kind. To reach the optimum usability, all these elements will be grouped in the same box (two boxes for the demonstrator) and miniaturized.

Figure 4:
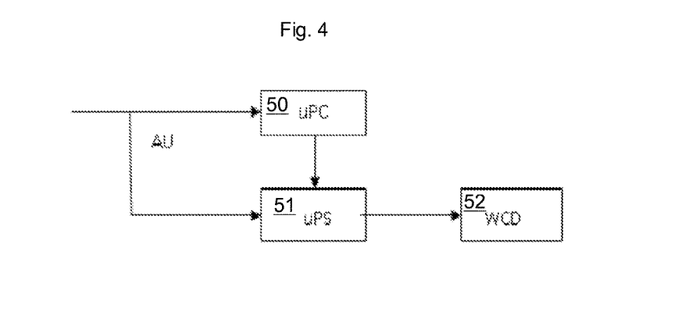
FIG. 4 shows a block diagram of a control circuit of the equipment.

FIG. 4 shows a block diagram of an electronic circuit, comprising a micro-processor 50, a security micro-controller 51 and a time delay circuit 52 of the "watchdog timer" type enabling the micro-processor 50 to resume control in case of crash by sending an external RESET control.

The micro-processor 50 comprises a flash memory TXFIFO. It controls the sending of an emergency stop frame every 10 ms until an acknowledgement frame ACK (Acknowledge signal radio, which means that the message has been received).

If an acknowledgement frame ACK is received, it sends a AU_OK message to the security micro-controller 51 and waits for the ends of the emergency stop.

When the emergency stop is over, it informs the security micro-controller 51 and the emergency stop end bridge and switches to the broadcast frequency.

The security micro-controller 51 configures the time delay circuit 52 to 100 ms. When the emergency stop is over, it reconfigures the time delay circuit 52 to 550 ms and switches to the standby mode.

Two serial peripheral interface (SPI) buses are used: as the frame is sent every 250 ms, if the SPI bus is busy with a transaction with one IMU, it is necessary to wait for the completion of the data acquisition to initiate a transmission.

The GPIO (General Purpose Input Output) port fulfills the following functions:
report the start and the end of the control (a control at normal rate)
report a higher rate
reset
emergency stop
Led : bridge connection indicator The security micro-controller 51 communicates with the control system through three ports:
one port, in interruption mode, to report that a control has reached the μPS
two to send the control The controls are as follows:
time delay circuit 52 reset, correct operation=1
Deactivation 2
Reactivation 3
emergency stop OK 4
0 no control Bridge The bridge starts on the operating frequency (broadcast) in reception mode. It listens to all the frames sent thereto.
Upon receiving a frame:
it sends an acknowledgement
it sends a frame containing its communication frequency
upon receiving the acknowledgement, it switches to the communication frequency in reception mode
actuates the STN at 500 ms and initiates a STATE=0 variable
the STATE variable is incremented upon each reception, and the control is processed
If the 500 ms time expires:
If STATE=0 (no frame is received for 500 ms), stops the current controls and switches to the operating frequency.
If STATE>0, (reception of at least one frame), resets STATE to 0.

Detailed Description of the Controls

| | Functions | execution of the function | technical solution |
|---|---|---|---|
| Power on | Transmitting part | | 3.7 VLi ion 250 mAh battery |
| | Receiving part | | Transfo circuit 48 VAC 220 VAC |
| | Start/Horn | Press a contactor for 2 sec | strap contactor |

-continued

| Functions | | execution of the function | technical solution |
|---|---|---|---|
| Move | Right | Press the contactor then move the hand to the right | imu + finger contactor |
| | Left | Press the contactor then move the hand to the left | imu + finger contactor |
| | front | Press the contactor then move the hand frontwards | imu + finger contactor |
| | back | Press the contactor then move the hand backwards | imu + finger contactor |
| | Up | Press the contactor then move the hand upwards | imu + finger contactor |
| | Down | Press the contactor then move the hand downwards | imu + finger contactor |
| Move *2 (diagonal motion) | Right + front | Press the contactor then move the hand to the right and then frontwards | imu + finger contactor |
| | Right + back | Press the contactor then move the hand to the right and then backwards | imu + finger contactor |
| | Right + up | Press the contactor then move the hand to the right and then upwards | imu + finger contactor |
| | Right + down | Press the contactor then move the hand to the right and then downwards | imu + finger contactor |
| | Left + front | Press the contactor then move the hand to the left and then frontwards | imu + finger contactor |
| | Left + back | Press the contactor then move the hand to the left and then backwards | imu + finger contactor |
| | Left + up | Press the contactor then move the hand to the left and then upwards | imu + finger contactor |
| | Left + down | Press the contactor then move the hand to the left and then downwards | imu + finger contactor |
| | Front + up | Press the contactor then move the hand frontwards and then frontwards | imu + finger contactor |
| | Front + down | Press the contactor then move the hand frontwards and then frontwards | imu + finger contactor |
| | Back + up | Press the contactor then move the hand frontwards and then frontwards | imu + finger contactor |
| | Back + down | Press the contactor then move the hand frontwards and then frontwards | imu + finger contactor |
| | Strumming | Press the contactor then rotate the hand to the right, successively press the contactor taking into account the orientation of the last motion. | imu + finger contactor |
| | PV GV | After validating a displacement, release and then press the contactor | Finger contactor |
| | Emergency stop | Press the red button (upper part) | Red contactor |
| Visually indicate | Motion | Led on | Green led |
| | Battery | Led on | Red led |
| | Battery Charging | Flashing | Green leds, |
| | | 3 leds on | Green leds, |
| | Connection | Led on | Blue led |
| | Connection | Flashing led | Flashing |
| | Charge | Adapter + usb cable/male jack on the socket | 5 V power supply through a jack |
| Process sensor data | | Use 2 micro-processors | STM321053 |
| Store motions | | Save executed motions with date and time | Memory chip on the receiving module |
| Last for one week work | | Low consumption/Sleep mode | Low energy components |
| Change truck | truck 1 | basic No pressing (A, each pressure, change in this order: truck 1, truck 2, trucks 1 and 2) | Contactor 1 strap |
| | truck 2 | Press to switch | Contactor 1 strap |
| | trucks 1 and 2 | Press to switch | Contactor 1 strap |
| Pitch mode | | Press to switch | Contactor 2 strap |
| Switch On/Off light | | Press to switch | Contactor 3 strap |
| Limit switch shunt | | Press to switch | Contactor 4 strap |
| Control filtering | Anti-strumming | No strumming | soft |
| | PV GV synchronization | Press twice contactor inactive finger | soft |
| IR validation to start | | Point the IT signal to the receiving terminal | IR cell |
| Safe motions | | Press 2 contactors | Finger contactor and strap contactor |
| Hazard/vibrator | | | vibrator |

Functional Description

The first step is a starting and glove configuration phase.

The system starts at the frequency assigned to the equipment. The address of the receiving party is factory coded or saved using an identification (RFID, etc.) and matching procedure.

The security micro-controller enters a sleep phase to save energy. The glove will be awakened by a signal received at the control interface.

The next step is a connection phase:

After obtaining the address, the glove sends a request for connection to the bridge. The bridge transmits its OK with the frequency to be used for communication (its operating frequency). If the bridge does not respond, the glove retransmits the request after a random waiting time to avoid collision.

After receiving connection information, the reconfiguration of the radio link is controlled.

In case of connection failure (bridge already used, radio problem), the return to the broadcast frequency is controlled.

After connection:

The glove starts sending a frame every 250 ms for a defined THM (dead man time) with a transmission repeated three times. The user can then start controlling the bridge. A button is eventually provided for starting the system, which enables the user to move from one bridge to another without waiting for 5 minutes (the dead man time). Pressing the AU resets the system, which allows a direct switch to the initial configuration thus to the broadcast frequency Control phase (glove):

The user presses the button to indicate his/her intent to control the machine:

If the glove is not already connected, the connection phase is executed.

This is followed by the activation of the data acquisition phase:

Activation of the Man Machine Interface IMU data reading.

Identification of the movement and updating of the frame.

Updating a variable indicating the proper functioning of this part.

The step above will be interrupted every 250 ms to send a frame so as to maintain the operational connection.

The control will be included in all frames until the user releases the button.

After releasing the button:
Updating of the frame.
Reset dead man time to start a new cycle.
Dead man stop.
Upon expiry of the "dead man time."
Transmitting portion (glove):
Returns to the broadcast frequency,
Informs the security portion (security micro-controller) that it will enter a state of normal non-operation,
Energy management and sleep, it will be awakened by the GPIO (User Button).
The receiving portion (bridge):
Stops the bridge in case of a displacement,
Returns to the broadcast frequency.
Stop because of a transmission problem:
Transmitting portion (glove):
Nothing to do, the security micro-controller resets the system. The glove executes the start-up phase and directly switches to the broadcast frequency.
Receiving portion (bridge):
Stop all current control,
Switch to the Broadcast Channel.

Emergency stop:
The user presses the emergency stop button.
The system sends an emergency stop frame every 20 ms until it receives acknowledgement.
The bridge remains the operation frequency, and associated with the strap that activated the emergency stop. No other user can use the bridge.
All frames except the frame that ends the emergency will be rejected by the receiving party.
After receiving the frame that ends the emergency stop, the bridge remains at the operating frequency for a normal operation.
Provide for a horn on the receiving portion so that the user does not switch the bridge to emergency stop mode and goes home, which makes the bridge unusable by others.
Provide for an emergency stop button on the bridge in case of radio failure.

Alternative Embodiments

The invention may have different alternative embodiments.

Orientation of the user in space.

The invention can be implemented in two modes of operation.

In the first mode, the device controls the movement in the direction seen by the operator. When moving his/her arm to the right, the controlled movement is directed toward the operator's right, regardless of his/her relative position with respect to the controlled equipment.

In a second embodiment, the equipment controls the movement in the direction seen by the operator. When moving his/her arm to the right, the controlled movement is directed to the right of the equipment, regardless of his/her relative position with respect to the controlled equipment.

The remote control device may include an operator's position sensor in an absolute reference system, for example, in relation to the geographic north, or an operator's relative position sensor relative to a reference system of the controlled equipment.

Geo-Location

The remote equipment may be provided with a geo-location means for identifying the user's position relative to the controlled equipment, so as to enable the discrimination of multiple operators each controlling a device in a common area, for example, a site wherein multiple devices are active and to limit the distance of use. The operator must be within 40 meters, for example, to be able to control the bridge; being any further could be dangerous because of poor vision.

Equipment Adaptability

The equipment may include means for saving characteristics specific to the controlled equipment. The "function" micro-controller then adapts to various neighboring lifting devices.

The invention claimed is:

1. A remote control for controlling equipment, comprising:
an electronic circuit including at least one sensor configured to detect the position, orientation, and movement of a hand and/or a forearm of a person using the remote control;
a transmitter for transmitting a radio frequency control signal calculated depending on the detected position, orientation, and movement;
a fastener for fastening at least a portion of the remote control to the forearm of the person using the remote control; and
a contactor configured to be actuated by the interaction of two fingers of the person using the remote control, the contactor controlling activation of the electronic circuit and maintenance of the control signal until actuation of the contactor is stopped, a bearing surface associated with the contactor controlling an emergency stop of the controlled equipment.

2. The remote control of claim 1, wherein the electronic circuit comprises a threshold detector for generating a control signal when a signal corresponding to the detected position, orientation, or movement exceeds a threshold value, and the control signal is maintained until the actuation of the contactor is stopped.

3. The remote control of claim 1, wherein the remote control further comprises complementary first and second modules, the first module comprising a strap, a box containing the electronic circuit secured to the strap, and the at least one sensor, the second module comprising the contactor, the contactor being configured to be positioned around one finger of the person using the remote control.

4. The remote control of claim 3, wherein the box includes a single connector configured to receive a connector of the second module and/or a connector of a power charger.

5. The remote control of claim 3, wherein the remote control further comprises a second contactor positioned on the first module and intended to be controlled by a second hand of the person using the remote control.

6. The remote control of claim 1, wherein the at least one sensor comprises an accelerometer configured to detect accelerations along three perpendicular axes.

7. The remote control of claim 1, wherein the at least one sensor comprises a gyroscope configured to detect rotations in three directions.

8. The remote control of claim 1, wherein the at least one sensor comprises a magnetometer for detecting a magnetic orientation.

9. The remote control of claim 1, wherein the at least one sensor comprises an inertial measurement unit comprising an accelerometer with three perpendicular axes, a gyroscope with three rotational axes, and a three-axis magnetometer.

10. The remote control of claim 8, wherein the inertial measurement unit is configured to detect an angle of slope, an orientation, and accelerations along three perpendicular axes.

11. The remote control of claim 1, wherein the remote control further comprises an emergency stop button.

12. The remote control of claim 1, wherein the remote control further comprises a plurality of contactors for selecting the controlled equipment or one of a plurality of functionalities of the controlled equipment.

13. The remote control of claim 1, wherein the remote control further comprises a digital stepping or two-way contactor.

14. The remote control of claim 1, wherein the remote control is configured to selectively operate in a strumming mode according to a storage of a last direction detected by the at least one sensor and on repeated actions on the contactor.

15. The remote control of claim 1, wherein the remote control is configured to selectively control movement of the controlled equipment at two or more rates of displacement.

* * * * *

UNITED STATES PATENT AND TRADEMARK OFFICE
CERTIFICATE OF CORRECTION

PATENT NO. : 10,176,707 B2
APPLICATION NO. : 15/739010
DATED : January 8, 2019
INVENTOR(S) : Frédéric Hamain, Nicolas Iriart and Nicolas Klis Page 1 of 1

It is certified that error appears in the above-identified patent and that said Letters Patent is hereby corrected as shown below:

In the Specification
    Column 1, Line 67, change "finger with the" to --finger and with the--
    Column 4, Line 66, change "index and makes" to --index finger and makes--
    Column 7, Line 42, change "e.g., a erroelectric" to --e.g., a ferroelectric--

In the Claims
Claim 10, Column 14, Line 8, change "of claim 8," to --of claim 9,--

Signed and Sealed this
Twelfth Day of March, 2019

Andrei Iancu
*Director of the United States Patent and Trademark Office*